(12) United States Patent
Moreno

(10) Patent No.: US 6,422,259 B1
(45) Date of Patent: Jul. 23, 2002

(54) APPARATUS AND METHOD FOR ACTUATOR STROKE AND SPRING PRELOAD SETTING

(75) Inventor: Alejandro Moreno, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/706,205

(22) Filed: Nov. 3, 2000

(51) Int. Cl.$^7$ ............................................. F16K 27/10
(52) U.S. Cl. ............................. 137/15.18; 251/129.18; 251/366
(58) Field of Search ...................... 251/129.15, 129.18, 251/366; 137/15.18

(56) References Cited

U.S. PATENT DOCUMENTS

| | | | | |
|---|---|---|---|---|
| 4,790,345 A | * | 12/1988 | Kolchinsky | 251/129.15 X |
| 4,830,333 A | * | 5/1989 | Watson | 251/129.18 |
| 6,050,542 A | * | 4/2000 | Johnson et al. | 251/129.15 |

FOREIGN PATENT DOCUMENTS

| CA | 698160 | * 11/1964 | 251/129.18 |
|---|---|---|---|

\* cited by examiner

*Primary Examiner*—Kevin Lee
(74) *Attorney, Agent, or Firm*—Margaret A. Dobrowitsky

(57) ABSTRACT

An apparatus and method for simultaneously setting the stroke and biasing force of a valve assembly, the apparatus utilizes a securement member which individually sets the biasing force of a valve assembly. The stop assembly allows a stop member, for setting the stroke of the valve assembly, and a securement member, for setting the biasing force of the valve assembly, to be secured simultaneously.

30 Claims, 3 Drawing Sheets

APPARATUS AND METHOD FOR ACTUATOR STROKE AND SPRING PRELOAD SETTING

TECHNICAL FIELD

The present application is related to an apparatus and method for simultaneously setting an actuator stroke and spring preload.

BACKGROUND OF THE INVENTION

In order to define the range of a plunger in a mechanically manipulated actuator, the stroke (i.e. range of travel) of a plunger to be manipulated by the actuator must be set. In addition, and in order to define a threshold value at which the plunger of an actuator is to be manipulated, a force greater than a resistance force being applied to the plunger must be determined. This force or threshold value generally is greater than a mechanical biasing device providing the biasing force. Generally, a spring is utilized to provide this biasing force.

Accordingly, and in order to define the stroke and spring biasing force of an actuator or other device, the stroke is set and then the biasing force is provided to the device. In applications such as an assembly line process, where such a device is manufactured, the setting of the stroke and the preloading of the spring are performed separately during the manufacturing process. Additional manufacturing steps add to the overall cost of a produced item.

Accordingly, there is a need for an improved method for setting the stroke and spring preload, a bias of an actuating assembly for use in mechanical operations.

SUMMARY OF THE INVENTION

A method and apparatus for setting the stroke and spring preload of an actuating assembly, wherein the stroke and spring preload are set simultaneously, providing for a more accurate setting of the valve assembly while reducing the overall manufacturing time and cost for such an item.

An actuating stop assembly whereby the stroke and spring preload are set simultaneously. The assembly is configured for use in various solenoid assemblies.

An actuating stop assembly for improving the valve performance by reducing the variability in assembly.

The above-described and other features and advantages of the present invention will be appreciated and understood by those skilled in the art from the following detailed description, drawings, and appended claims.

DESCRIPTION OF THE PREFERRED EMBODIMENT

Figure 1:
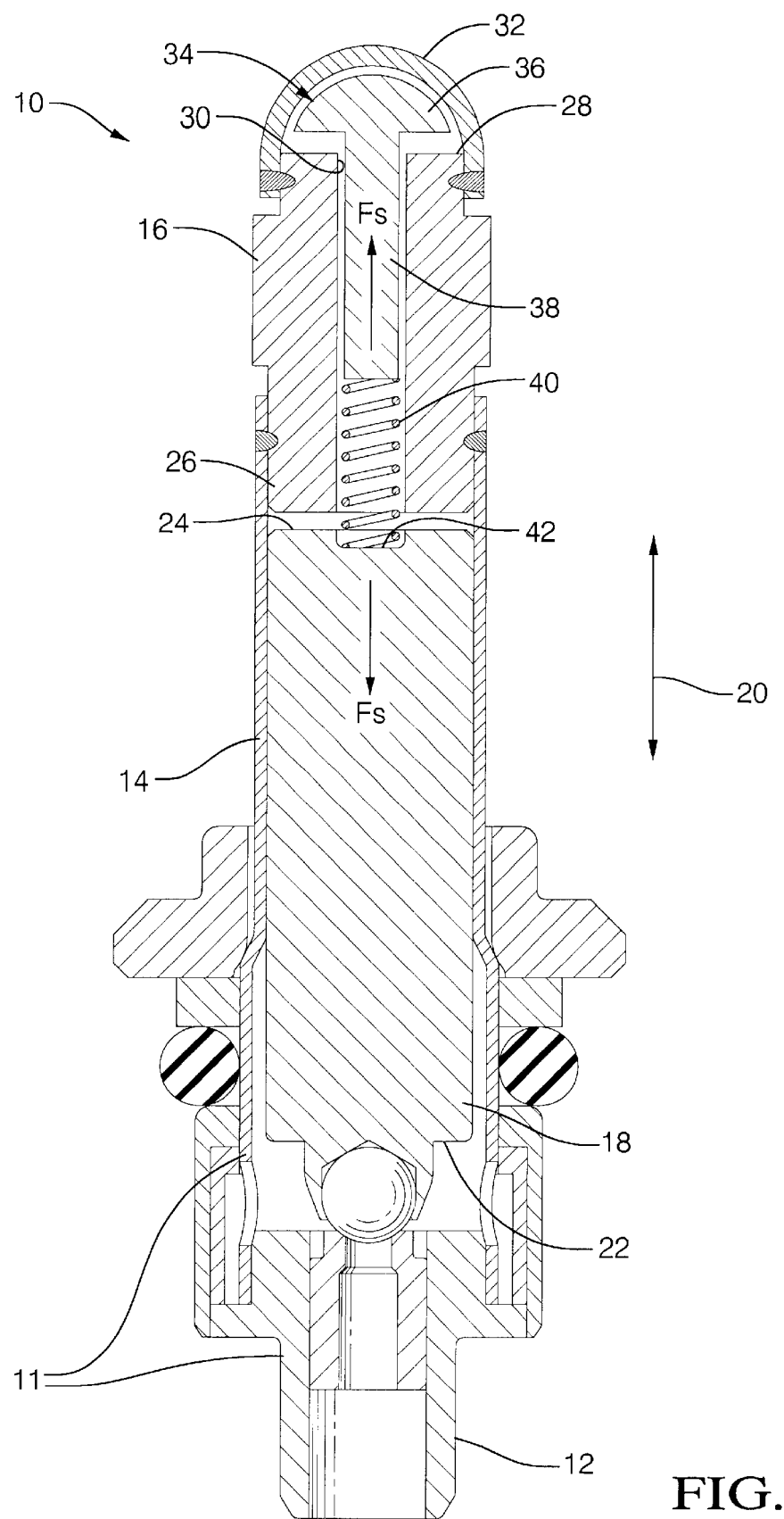
FIG. 1 is a cross-section of a view of a valve assembly constructed in accordance with the instant application.
Figure 2:
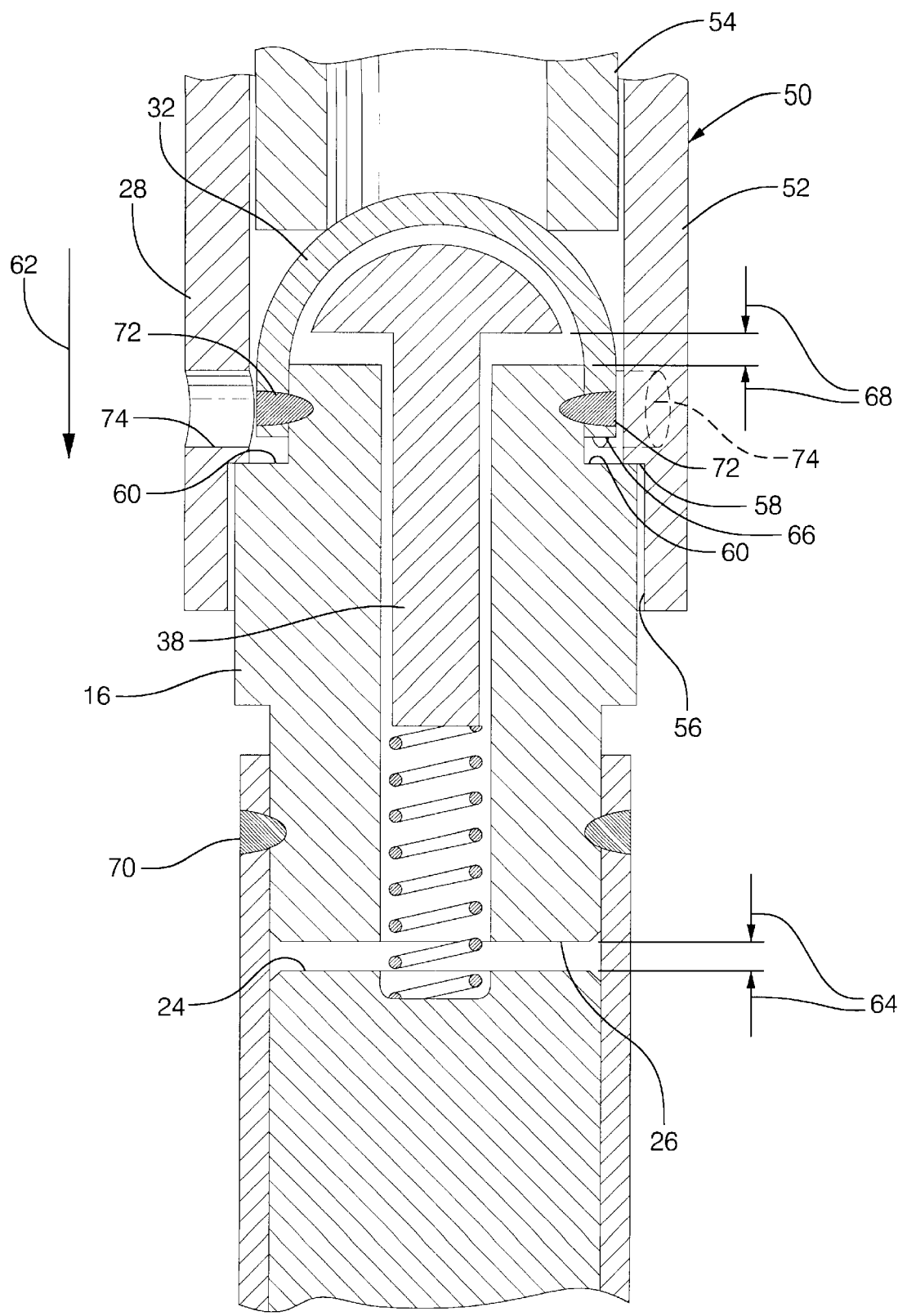
FIG. 2 is an enlarged cross-section of a view of a portion of the valve assembly illustrated in FIG. 1 and a securement member contemplated for use in accordance with the instant application.

Referring now to FIGS. 1 and 2, a valve assembly 10, constructed in accordance with the present invention, is illustrated. Valve assembly 10 includes a housing and tube assembly 11. Housing and tube assembly 11 has a tube assembly 12 and an elongated tube 14. Tube 14 is secured to housing and tube assembly 11 at one end and a stop assembly 16 at the other. In an exemplary embodiment, valve assembly 10 is secured to a conduit supplying a hydraulic fluid for use in automotive applications such as a brake line. Of course, and as contemplated in accordance with the instant application, valve assembly 10 may be secured to any type of conduit or tube supplying a liquid, gas or pressurized gas from a supply to a desired location.

Valve assembly 10 is constructed so that a plunger 18 is manipulated between a closed position and an open position. Plunger 18 is received within tube 14 and is configured to move in the directions defined by arrow 20. Plunger 18 is cylindrical in shape, having a valve end portion 22 and a spring end portion 24. Of course, plunger 18 may have any configuration suitable for movement within tube 14.

Stop 16 is also cylindrical in shape and has a spring end portion 26 and an end portion 28. Stop 16 is configured so that the outside diameter of spring end portion 26 is slightly smaller than the inside diameter of tube 14. Stop 16 has a through opening 30. Opening 30 passes from spring end portion 26 to end portion 28. End portion 28 is also configured so that the outside diameter of end portion 28 is slightly smaller than the inside diameter of a retaining member 32. Retaining member 32 is configured to have a cuplike configuration that resembles a half circle. In an exemplary embodiment, retaining member 32 is constructed out of a metallic material, preferably a non-magnetic material having malleable and weldable qualities. Of course, and as applications may require, retaining member 32 may have an alternative configuration such as an angular or rectangular configuration illustrated by the dashed lines in FIG. 3. In addition, and in such alternative embodiments, pin 38 is configured to have a similar configuration of retaining member 32.

A pin 34, having a head portion 36 and a stem portion 38, is configured so that the outside diameter of stem portion 38 is slightly smaller than the diameter of opening 30. Stem portion 38 is secured to head portion 36 at one end and makes contact with a spring 40 at the other. In an exemplary embodiment, spring 40 is a cylindrical spring making contact with stem portion 38 at one end and is seated within an opening 42. Opening 42 is positioned on end portion 24 of plunger 18. In addition, opening 42 is configured to receive and support a portion of spring 40. The positioning of opening 42 also allows spring 40 to be aligned with stem portion 38.

Alternatively, end portion 24 is configured to have a flat surface.

Figure 3:
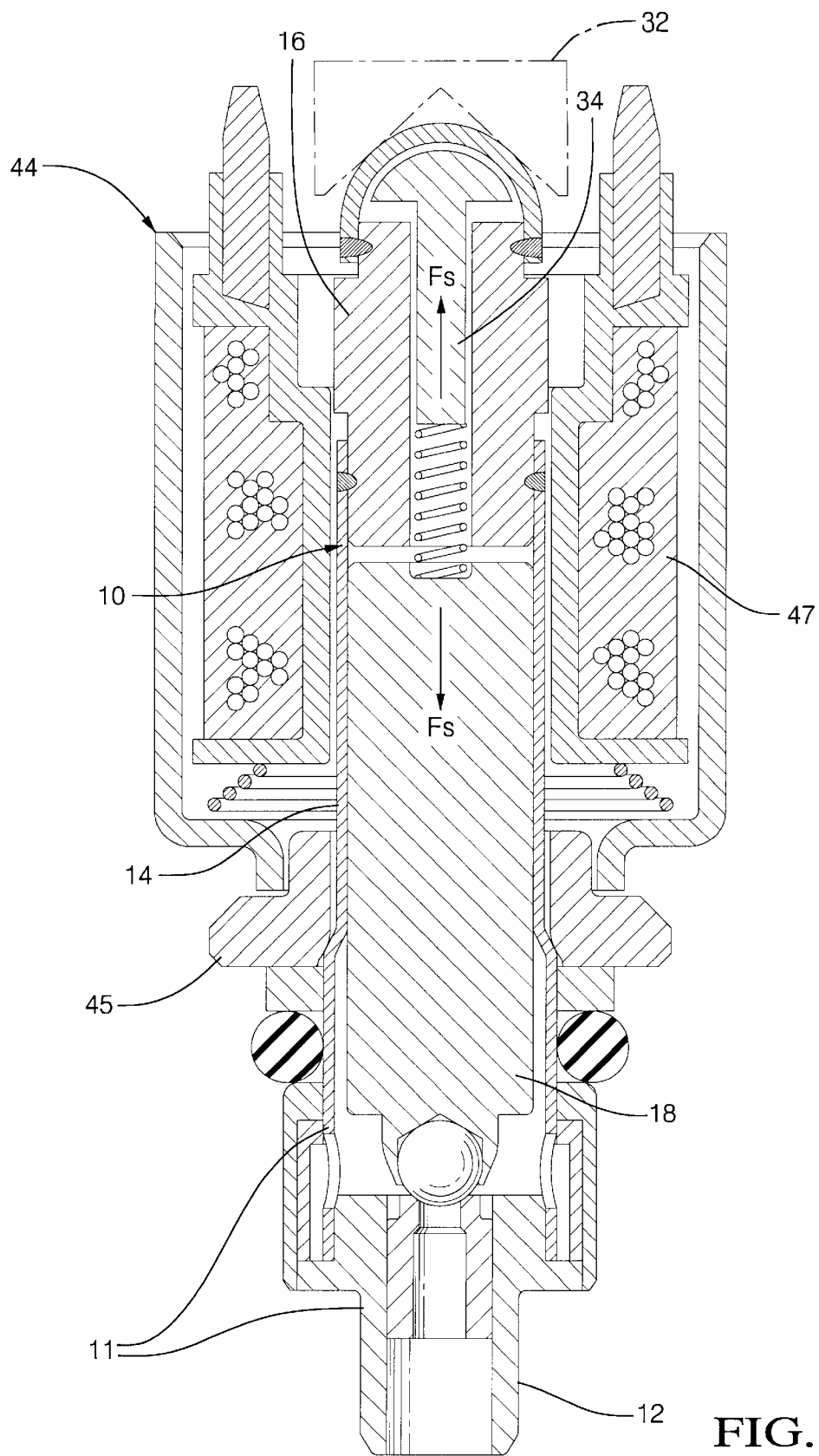
FIG. 3 is a cross-section of a view of a valve assembly.

In an exemplary embodiment, and referring now to FIG. 3, a coil assembly 44 is positioned outside of tube 14. Coil assembly 44 surrounds or contacts all components making up the magnetic path, flange 45, stop 16, plunger 18, and tube 14 of assemblies 10 and 11. Accordingly, and as an electrical current flows through the wire winding of a coil 47, an electromagnetic force is generated that will force plunger 18 towards stop 16.

In an exemplary embodiment, stop 16 and pin 34 are constructed out of ferromagnetic metal and non-magnetic materials respectively. Thus, the magnetic flux flows through stop 16. Such materials can be plastic, metal, etc.

The stop and pin are specifically designed to guide the magnetic flux producing the magnetic force of coil assembly 44 while plunger 18 is constructed out of a ferromagnetic metal material such as steel, which is capable of being drawn magnetically.

Referring now in particular to FIG. 2, the securement of the stop assembly of the instant application is illustrated. Here, a securement fixture 50 makes contact with both stop 16 and retaining member 32. Securement fixture 50 has a pair of elongated cylinders or tubes with an outer cylinder 52 and an inner cylinder 54. The outside diameter of inner cylinder 54 is slightly smaller than the inside diameter of outer cylinder 54 so as to allow for the movement of inner cylinder 54 with respect to outer cylinder 52.

Outer cylinder 52 is configured to have an engagement opening 56 which is slightly larger than the outside diameter of stop 16. Opening 56 is configured to have a shoulder portion 58 positioned on the inner surface of outer cylinder 52. Shoulder portion 58 engages a shoulder portion 60 of stop 16. Accordingly, and as outer cylinder 52 moves in the direction of arrow 62, shoulder portion 58 makes contact with shoulder portion 60 and accordingly, stop 16 also moves in the direction of arrow 62.

As an alternative, engagement of outer cylinder 52 and stop 16 is facilitated so as to allow for the movement of outer cylinder 52 and stop 16 in both the positive and negative directions with regard to arrow 62. Accordingly, and as outer cylinder 52 moves in a direction opposite to arrow 62, stop 16 moves accordingly. Possible forms of engagement between outer cylinder 52 and stop 16 may be magnetic attraction, fictional engagement or spring-loaded balls which will create a frictional attraction between the outer cylinder and the stop.

As yet another alternative or supplement to the preferred embodiment, outer cylinder 52 is a magnetic material or a magnetically conductive material provided with an electromagnetic force for engaging and securing to stop 16.

As stop 16 moves in the direction of arrow 62, end 26 of stop 16 is moved closer to end 24 of plunger 18. The resulting airgap between end 26 and end 24 is defined by arrows 64 or also defined as the "stroke" of valve assembly 10.

In order to provide the spring loading adjustment to the valve stop assembly of the instant application, inner cylinder 54 is also moved in the direction of arrow 62 until it makes contact with retaining member 32. Retaining member 32 is configured to have a cylindrical or half circle shape with an end portion 66. The inside diameter of retaining member 32 proximate to end portion 66 is slightly larger than the diameter of end portion 28 of stop 16. Accordingly, and as inner cylinder 54 moves in the direction of arrow 62, end portion 66 of retaining member 32 moves closer to shoulder portion 60 of stop 16. In addition, the inner surface of retaining member 32 makes contact with head portion 36 of pin 34. This also causes stem 38 to move through opening 30 in the direction of arrow 62, causing spring 40 to be compressed against end portion 24 of plunger 18. Accordingly, as spring 40 is compressed in the direction of arrow 62, spring 40 is provided with a preloaded biasing force. The distance between head portion 36 and end portion 28, defined by arrows 68, is defined as the spring load adjustment.

For example, and assuming that spring 40 is in contact with pin 34 and opening 42 of end portion 24, with an initial airgap defined by arrows 68, as the size of the initial airgap is reduced, the spring loading force increases. As the inner cylinder 54 travels in the direction of arrow 62, the spring load with the given travel characteristics of spring 40 within the assembly are determined.

In an exemplary embodiment, the cylindrical portion of retaining member 32 has a radius greater than the radius of head portion 36 of pin 34. This provides for a point of contact between retaining member 32 and pin 34, as opposed to an area contact. Therefore, variation due to the point of contact, as inner cylinder 54 is moved in the direction of arrow 62, relative to pin 34 is reduced or eliminated. In an exemplary embodiment, the radius of the retaining member is 3.80 mm while the radius of head portion 36 is 3.2 mm. Of course, and as applications may require, these dimensions may vary.

The thickness of retaining member 32 or outside diameter of retaining member 32 proximate to end portion 66 is slightly smaller than the surface area or outside diameter of stop 16 defining shoulder portion 60. This configuration will allow shoulder portion 58 of outer cylinder 52 to engage shoulder portion 60 of stop 16 while inner cylinder 54 makes contact with and adjusts the position of retaining member 32. In an exemplary embodiment, the thickness of retaining member 32 is 0.28 mm. Of course, and as applications may require, these dimensions may vary.

As a force is applied in the direction of arrow 62 by securement fixture 50, stop 16 is moved until portion 24 of plunger 18 and portion 26 of stop 16 contact each other, defining the "zero" stroke stop position for stop 16. Stop 16 is then retracted to define the wanted stroke position, while at the same time, retaining member 32 is moved to provide the wanted spring load adjustment. Once stop 16 and pin 34 are in the desired location, stop 16 is secured to tube 14 by a weld 70. In addition, retaining member 32 is secured to stop 16 by a weld 72. In order to effectuate the weld of retaining member 32 to stop 16, outer cylinder 52 has an opening 74. Opening 74 passes through outer cylinder 52 and provides an opening through which a laser (not shown) can effectuate the weld of retaining member 32 to stop 16. In addition, and since valve assembly 10 is configured to rotate about its longitudinal axis, the laser is able to create welds 70 and 72 as valve assembly 10 is rotated.

Thus, through the simultaneous and independent movement of cylinders 52 and 54, the stroke and spring preload are set simultaneously.

As an alternative, and in applications where outer cylinder 52 is configured to have a non-cylindrical shape, opening 74 can be replaced with a channel positioned on the inner surface of outer cylinder 52, as illustrated by the dashed lines in FIG. 2.

In an exemplary embodiment, a normally closed actuator has a stop assembly which will allow two critical valve assembly parameters to be set simultaneously, the stroke of the plunger and the preload of the spring acting against it to hold it in the closed position. The position of the stop and normally closed actuator assembly is set to the displacement limit of the plunger from its closed position. This plunger displacement or stroke also makes up the primary airgap of the magnetically actuated valve. The magnetic force counteracts the hydraulic or pneumatic and/or mechanical forces acting against the plunger throughout its stroke. The magnetic force produced through the primary airgap is critical to the valve performance. The control of the load variation on the spring, along with the existing actuator to actuator assembly variation in its installed position, is just as critical as setting the valve stroke for most pulse width modulated (PWM) or tight performance requirements on solenoid type actuators.

The assembly allows both the stroke and spring preload to be set simultaneously, using standard valve assembly processes.

The stop assembly is comprised of three components, a cup, T-shaped pin, and stop. The cup and pin are made up of non-magnetic materials (they are preferred but they can also be magnetic) while the stop is magnetic. A through hole in the stop serves as the guide for the pin and the spring. A small pocket in the top of the plunger surface serves as a guide to align the spring between stop and plunger. However, and when alignment is not required, this can be a flat faced surface. The spring is compressed between the top surface of the plunger and the pin. The cup slides freely over the stop. The head of the pin tops off against the inside spherical contour of the cup and slides freely within the stop. The position of the stop relative to the face of the plunger is the stroke for the actuator. The stroke, plus the position of the cup relative to the stop, combine to adjust the spring preload. The assembly allows processes similar to traditional methods to still be used, however enhanced outcomes are obtained. The plunger and spring are placed inside the housing and tube assembly. The tube and housing assembly is fastened to a bottom fixture that is fixed radially but rotates about the longitudinal axis. The cup, pin, and stop are held above the tube and housing assembly with a cylindrical fixture (FIG. 2).

The cylindrical fixture has an upper fixture constructed out of a small cylinder that shuttles axially within a larger cylinder. The stop is held by the outer cylinder and the cup bottoms out against the inner cylinder. The upper fixture can move freely about the longitudinal axis. The upper and lower fixtures are lined along the longitudinal axis. The lower fixture holding the valve assembly can spin freely about this axis. The upper fixture is lowered into the lower fixture until the stop bottoms out against the plunger. This is the "zero" stroke reference point. At the same time, the spring load is being monitored as a function of the stop assembly displacement through the inner cylinder of the upper fixture. Once the "zero" stroke stop position is identified, the outer cylinder is retracted to set the desired plunger stroke, and the inner cylinder is also moved to set the position of the cup for the desired plunger spring preload. After these two parameters have been set, the cup and stop, and the stop and tube are permanently attached.

As an alternative, the fixture outer cylinder may be supplied with a magnetic force, friction feature or any other attachment feature in order to draw the stop towards the outer cylinder.

In an exemplary embodiment, a three-piece stop assembly enables the valve stroke and closed position plunger spring preload to be set simultaneously. The stop assembly allows the spring load to be monitored as a function of the stop displacement, supplying the individual spring constant used to determine the valve assembly spring compression height before the stroke has been set. A load cell attached to the inner cylinder on the upper fixture is used to monitor spring preload as the fixture moves axially. The variation in components and other associated valve assembly parameters for spring force are eliminated as a function of the valve stroke. The packaging of the spring in the stop and plunger pocket are specified so no additional magnetic reluctance is added to the actuator magnetic circuit. The spring preload is set in the same cycle time normally taken by the stroke setting process alone. The cup-to-stop interface and stop-to-tube interface are attached and sealed simultaneously.

Valve performance level and capability is improved by the elimination of variation in components and other associated valve assembly parameters for spring force. Performance and capability is improved without adding a machine or increasing cycle times to a manufacturing line.

No other methods allow for setting of stroke and spring load in a valve simultaneously. For example, one alternative allows the spring load to be adjusted after the valve stroke has been set. This feature is added by packaging a screw against the spring that can be adjusted to compress the spring to the desired load. Another alternative design is one that allows the spring preload to be adjusted before the valve stroke is set. This method allows the spring preload to be preset to a constant reference stroke. In this method, a tube-shaped plunger and a pin-shaped rod are pressed into each other, producing a spring pocket with an adjustable depth, wherein the spring pocket depth is controlled at a constant stroke that produces the desired installed spring preload.

In contrast to these alternatives, the setting of the stroke and spring preload, simultaneously eliminates component and other associated valve assembly parameter variations for spring force, directly as a function of the valve stroke. Setting valve spring preload before stroke does not eliminate spring load variations caused by stroke variation.

The spring preload is set in the same cycle time normally taken for stroke setting alone. This cannot be achieved by assembly process methods that separate them.

If additional cycle time can be planned into the assembly process because of the need to set spring preload, having the capability to set it simultaneously with the stroke allows for the added cycle time to be used for more precise control of the plunger stroke setting. (The speed at which the plunger stroke is set is a significant source of variation on this process)

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for setting a stroke and a biasing force of a plunger of a valve assembly, comprising:
   a) simultaneously setting the stroke and biasing force of the plunger of the said valve assembly by manipulating the position of a spring and a stop of the valve assembly;
   b) welding said stop to a housing of the valve assembly and welding a retaining member to said stop.

2. A method for setting the stroke and a biasing force of a valve assembly, comprising:
   applying a device having an outer cylinder and an inner cylinder to said valve assembly, said outer cylinder makes contact with a stop of said valve assembly and adjusts the position of said stop, said inner cylinder makes contact with a retaining member and adjusts the position of said retaining member, wherein said device simultaneously sets the stroke and biasing force of said valve assembly by adjusting the position of said stop and said retaining member; and
   welding said stop to a housing and welding said retaining member to said stop.

3. A valve assembly, comprising:
   a) a valve housing having a valve opening;
   b) a tube being secured to said valve housing at one end and having an opening at the other;

b) a plunger being configured and dimensioned to be slidably received within said tube, said plunger having a valve end at one end and an engagement surface at the other, said valve end being configured and dimensioned to block said valve opening when said plunger is in a first position;

c) a stop member being configured and dimensioned to have a portion of said stop member received within said opening of said tube, said stop member having a through opening;

d) a pin having a stem portion and a head portion, said stem portion being configured and dimension to be received within said through opening of said stop member;

e) a spring member being received within said through opening of said stop member and making contact with said engagement surface of said plunger at one end and said stem portion at the other;

f) a securement member being configured, dimensioned and positioned to make contact with said head portion of said pin and a portion of said stop member.

4. The valve assembly as in claim 3, wherein said securement member is configured to have a semicircular shape and said head portion of said pin is configured to have a semicircular shape, said semicircular shape of said pin having a radius smaller than the radius of the semicircular shape of said securement member.

5. The valve assembly as in claim 3, wherein said stop member is fixedly secured to said tube to define a second position of said plunger, said first and second positions of said plunger define a range of travel for said plunger.

6. The valve assembly as in claim 5, wherein said securement member is fixedly secured to said stop member causing said spring member to be compressed by said pin and said spring provides a biasing force to said plunger.

7. A securement fixture for use with the valve assembly of claim 3, comprising:

a) an outer cylinder being configured and dimensioned to make contact with and engage with a portion of said stop member; and b) an inner member being configured, dimensioned and positioned to be slidably received within said outer cylinder, said inner member making contact with a portion of said securement member.

8. The valve assembly as in claim 3, wherein said stop member is configured to have a shoulder portion for engaging an outer cylinder of a securement fixture.

9. The securement fixture as in claim 7, wherein the inner surface of said outer cylinder is configured to have an opening, said opening providing an area for welding said securement member to said stop member.

10. The valve assembly as in claim 3, wherein said engagement surface has a receiving area for receiving a portion of the said spring member.

11. The valve assembly as in claim 3, wherein said spring member is a biasing member.

12. The valve assembly as in claim 3, wherein a portion of said valve assembly is inserted into a coil assembly for generating a magnetic field, and said plunger being manipulated from said first position to a second position as a current is applied to said coil assembly.

13. A stop assembly for use in a valve assembly, comprising:

a) a stop member having a valve assembly contact portion being configured and dimension to be received within a tube of said valve assembly;

b) a through opening being positioned in said stop member;

c) a pin having a stem portion and a head portion, said stem portion being configured and dimensioned to be slidably received within said through opening of said stop member;

d) a securement member being configured, dimensioned and positioned to make contact with said head portion of said pin and a securement portion of said stop member, said securement portion of said stop member being configured and dimensioned to be slidably received into a portion of said securement member; and e) a spring being configured and dimensioned to be positioned within said through opening.

14. The stop assembly as in claim 13, wherein said valve assembly further comprises:

f) a plunger being configured and dimensioned to be slidably received within said tube, said plunger having a valve end at one end and an engagement surface at the other, said valve end being configured and dimensioned to block a valve opening when said plunger is in a first position and said plunger makes contact with a portion of said stop member when said plunger is in a second position.

15. The stop assembly as in claim 14, wherein said spring provides a biasing force to said plunger.

16. The stop assembly as in claim 13, wherein said stop member and said securement member are configured and dimensioned to be simultaneously adjusted by a securement device.

17. The stop assembly as in claim 16, wherein said securement device comprises:

a) an outer cylinder being configured and dimensioned to make contact with and engage with a portion of said stop member; and b) an inner member being configured, dimensioned and positioned to be slidably received within said outer cylinder, said inner member making contact with a portion of said securement member.

18. The stop assembly as in claim 17, wherein said stop member is configured to have a shoulder portion for engaging said outer cylinder of said securement device.

19. The stop assembly as in claim 17, wherein said outer cylinder is configured to have an opening, said opening providing an area for welding said securement member to said stop member.

20. The stop assembly as in claim 16, wherein said stop member and said securement member are simultaneously positioned with respect to said tube by said securement device.

21. The stop assembly as in claim 13, wherein said securement member and said head portion are configured to have a semicircular shape, said securement member having a radius of curvature that is larger than the radius of curvature of said head portion.

22. A valve assembly, comprising:

a plunger being configured to be slidably received within said valve assembly for movement between a first position and a second position, said plunger having a valve end at one end and an engagement surface at the other, said valve end being configured and dimensioned to block a valve opening when said plunger is in a first position, said valve end being in a spaced relationship with respect to said valve opening when said plunger is in said second position;

a stop having a through opening;

a pin having a stem portion and a head portion, said stem portion being configured to be slidably received within said through opening;

a spring being received within said through opening of said stop member and making contact with said engagement surface of said plunger at one end and said stem portion at the other; and a securement member being configured and positioned to make contact with said head portion of said pin and a portion of said stop member.

23. A stop assembly for use in a valve assembly, comprising:

a) a stop having a valve assembly contact portion being configured and dimension to be received within said valve assembly;

b) a through opening being positioned in said stop;

c) a pin having a stem portion and a head portion, said stem portion being configured and dimensioned to be slidably received within said through opening of said stop;

d) a securement member being configured to make contact with said head portion of said pin and a securement portion of said stop member, said securement portion of said stop being configured to be slidably received into a portion of said securement member; and e) a spring positioned within said through opening, said spring making contact with said stem portion at one end and a plunger of said valve assembly at the other.

24. A method for setting the stroke and biasing force of a plunger of a valve assembly, comprising:

inserting a stop into said valve assembly, said stop being configured to define a limit of travel of the plunger;

inserting a pin into said stop, said pin being configured to compress a spring in order to provide a biasing force against the plunger;

applying a retaining member to said pin, said retaining member limiting the travel of said pin in a first direction; and adjusting the position of said stop and said retaining member and securing said stop to said valve assembly and said retaining member to said stop.

25. The method as in claim 24, wherein the position of said stop and said retaining member are adjusted by a securement fixture.

26. The method as in claim 25, wherein said securement fixture is configured to simultaneously adjust the position of said stop and said retaining member.

27. The method as in claim 24, further comprising:

simulataneously securing said stop to said valve assembly and said retaining member to said stop.

28. The method as in claim 24, further comprising:

applying a device having an outer cylinder and an inner cylinder to the assembly, said outer cylinder makes contact with said stop and adjusts the position of said stop, said inner cylinder makes contact with said retaining member and adjusts the position of said retaining member.

29. The method as in claim 28, wherein said device simultaneously sets the stroke and biasing force of said valve assembly by adjusting the position of said stop and said retaining member.

30. The method as in claim 25, wherein said securement fixture includes means for allowing the securement of said stop and said retaining member while said securement fixture is applied to said stop and said retaining member.

* * * * *